US012744152B2

(12) United States Patent
Fu et al.

(10) Patent No.: US 12,744,152 B2
(45) Date of Patent: Sep. 22, 2026

(54) WINDING ASSEMBLY AND MAGNETIC ASSEMBLY

(71) Applicant: Delta Electronics (Shanghai) CO., LTD, Shanghai (CN)

(72) Inventors: Qi Fu, Shanghai (CN); Haibin Song, Shanghai (CN); Daofei Xu, Shanghai (CN); Zengyi Lu, Shanghai (CN); Jinfa Zhang, Shanghai (CN)

(73) Assignee: Delta Electronics (Shanghai) CO., LTD., Shanghai (CN)

( * ) Notice: Subject to any disclaimer, the term of this patent is extended or adjusted under 35 U.S.C. 154(b) by 719 days.

(21) Appl. No.: 17/226,521

(22) Filed: Apr. 9, 2021

(65) Prior Publication Data

US 2021/0350975 A1 Nov. 11, 2021

(30) Foreign Application Priority Data

May 7, 2020 (CN) ......................... 202020729987.1

(51) Int. Cl.
*H01F 5/00* (2006.01)
*H01F 27/06* (2006.01)
(Continued)

(52) U.S. Cl.
CPC ......... *H01F 27/2823* (2013.01); *H01F 27/06* (2013.01); *H01F 27/24* (2013.01); *H01F 41/061* (2016.01); *H01F 2027/065* (2013.01)

(58) Field of Classification Search
CPC .................................................... H01F 27/2823
(Continued)

(56) References Cited

U.S. PATENT DOCUMENTS 4,012,703 A 3/1977 Chamberlayne
5,652,561 A * 7/1997 Inoh ........................ H01F 17/04 336/200

(Continued)

FOREIGN PATENT DOCUMENTS

CN 201601008 U 10/2010
CN 101171652 B 3/2014

(Continued)

OTHER PUBLICATIONS

English translation of WO2013046259 (Year: 2013).*

(Continued)

*Primary Examiner* — Ronald Hinson

(74) *Attorney, Agent, or Firm* — Qinghong Xu

(57) ABSTRACT

The present invention provides a winding assembly and a magnetic assembly. The winding assembly comprises a first coil and a circuit board, and the first coil is embedded inside the circuit board; wherein the first coil comprises a conductive wire with at least one turn, and a height of the conductive wire in a direction perpendicular to the circuit board is not less than a width of the conductive wire in a direction parallel to the circuit board. The magnetic assembly comprises a first winding assembly and a magnetic core; wherein the first winding assembly comprises a first coil and a first circuit board, and the first coil comprises a conductive wire with at least one turn, the first coil is embedded inside the first circuit board, the first winding assembly is assembled with the magnetic core.

10 Claims, 8 Drawing Sheets

(51) Int. Cl.

| | |
|---|---|
| ***H01F 27/24*** | (2006.01) |
| ***H01F 27/28*** | (2006.01) |
| ***H01F 41/061*** | (2016.01) |

(58) Field of Classification Search

USPC .......................................................... 336/200

See application file for complete search history.

(56) References Cited

U.S. PATENT DOCUMENTS

| | | | |
|---|---|---|---|
| 6,124,778 | A | 9/2000 | Rowley et al. |
| 6,429,763 | B1 | 8/2002 | Patel et al. |
| 7,091,814 | B2 | 8/2006 | Kyriazidou |
| 7,298,238 | B1 | 11/2007 | Eaton |
| 7,932,801 | B2 | 4/2011 | Loef |
| 2002/0149461 | A1 | 10/2002 | Patel et al. |
| 2005/0212640 | A1* | 9/2005 | Chiang ............... H01F 27/2804 336/200 |
| 2007/0290784 | A1* | 12/2007 | Nesse ................... H01F 27/324 336/232 |
| 2008/0197960 | A1 | 8/2008 | Hasegawa et al. |
| 2008/0211613 | A1 | 9/2008 | Lin et al. |
| 2008/0284552 | A1 | 11/2008 | Lim et al. |
| 2010/0253153 | A1 | 10/2010 | Kondo et al. |
| 2011/0285215 | A1 | 11/2011 | Hatase et al. |
| 2014/0277223 | A1 | 9/2014 | Boone et al. |
| 2015/0155090 | A1* | 6/2015 | Burnett ............... H01F 27/2804 336/200 |
| 2016/0217913 | A1 | 7/2016 | Cheng et al. |
| 2016/0336106 | A1 | 11/2016 | Chung et al. |
| 2018/0174737 | A1 | 6/2018 | Song et al. |
| 2020/0357564 | A1 | 11/2020 | Kim et al. |
| 2022/0189687 | A1* | 6/2022 | Kotani .................... H01F 38/08 |

FOREIGN PATENT DOCUMENTS

| | | | |
|---|---|---|---|
| CN | 102460612 | B | 4/2015 |
| CN | 102782780 | B | 5/2015 |
| CN | 106653318 | A | 5/2017 |
| CN | 206471205 | U | 9/2017 |
| CN | 107533661 | A | 1/2018 |
| CN | 108352861 | A | 7/2018 |
| CN | 208189365 | U | 12/2018 |
| CN | 208189370 | U | 12/2018 |
| CN | 109215992 | A | 1/2019 |
| CN | 208570304 | U | 3/2019 |
| CN | 208848724 | U | 5/2019 |
| CN | 110289156 | A | 9/2019 |
| JP | S60718 | A | 1/1985 |
| JP | 2010178439 | A | 8/2010 |
| JP | 2011086655 | A | 4/2011 |

OTHER PUBLICATIONS

1st Office Action dated Nov. 15, 2022 of Chinese Application No. 202010376192.1.

The Extended European Search Report dated Sep. 30, 2021 for EP patent application No. 21167175.5.

Non-Final Rejection dated Oct. 26, 2023 of U.S. Appl. No. 17/232,531.

Notice of Allowance dated Oct. 28, 2023 of Chinese Application No. 2020103761921.

Non-Final Rejection dated Jan. 12, 2024 of U.S. Appl. No. 17/226,458.

Non-final OA dated Aug. 29, 2024 of U.S. Appl. No. 17/232,531.

Final OA dated Mar. 13, 2025 of U.S. Appl. No. 17/232,531.

Final OA dated Feb. 25, 2026 of U.S. Appl. No. 17/232,531.

* cited by examiner

WINDING ASSEMBLY AND MAGNETIC ASSEMBLY

CROSS REFERENCE

This application is based upon and claims priority to Chinese Patent Application No. 202020729987.1, filed on May 7, 2020, the entire content of which is incorporated herein by reference.

TECHNICAL FIELD

The disclosure relates to the technical field of power electronics, in particular to a winding assembly and a magnetic assembly.

BACKGROUND

Recently, the miniaturization, high efficiency and high frequency are the trends of switching power supply, and the application of planar transformers has been widely used. The transformer usually includes a primary coil, a secondary coil and a magnetic core. However, there are some drawbacks for the traditional planar transformer, for example, parasitic capacitor between the primary coil and secondary coil is relatively large, which seriously impact the efficiency of the power converter. How to reduce the parasitic capacitor is the key for the application of the planar transformer.

It should be noted that the information disclosed in the above Background section is only used to enhance the understanding of the background of the present disclosure, and therefore may include information that does not constitute the prior art known to those of ordinary skill in the art.

SUMMARY

According to a first aspect of the present disclosure, there is provided a winding assembly, which includes a first coil and a circuit board, the first coil being embedded inside the circuit board; wherein the first coil includes a conductive wire with at least one turn, and a height of the conductive wire in a direction perpendicular to the circuit board is not less than a width of the conductive wire in a direction parallel to the circuit board.

According to a second aspect of the present disclosure, there is provided a magnetic assembly, which includes a first winding assembly and a magnetic core, the first winding assembly being assembled with the magnetic core; wherein the first winding assembly includes a first coil and a first circuit board, and the first coil is embedded inside the first circuit board; the first coil includes a conductive wire with at least one turn, and a height of the conductive wire in a direction perpendicular to the circuit board is not less than a width of the conductive wire in a direction parallel to the circuit board.

It should be understood that the above general description and the following detailed description are only exemplary and explanatory, and cannot limit the present disclosure.

BRIEF DESCRIPTION OF THE DRAWINGS

By describing its exemplary embodiments in detail with reference to the accompanying drawings, the above and other objectives, features and advantages of the present disclosure will become more apparent.

DETAILED DESCRIPTION

Figure 1:
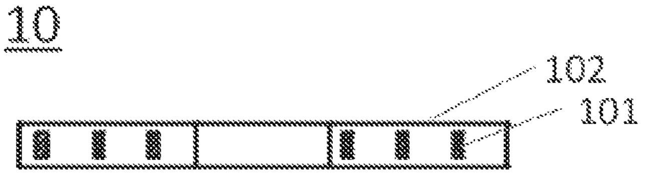
FIG. 1 is a schematic sectional view of a winding assembly according to an exemplary embodiment of the present disclosure.

Exemplary embodiments will now be described more fully with reference to the drawings. However, the exemplary embodiments can be implemented in various forms, and should not be construed as being limited to the examples set forth herein; rather, these embodiments are provided to make the present disclosure more comprehensive and complete, and fully convey the ideas of the exemplary embodiments to those skilled in the art. The drawings are only schematic illustrations of the present disclosure and are not necessarily drawn to scale. The same reference numerals in the drawings indicate the same or similar structures, and thus the detailed description thereof will be omitted.

Furthermore, the described features, structures, or characteristics may be combined in any suitable manner in one or more embodiments. In the following description, numerous specific details are set forth to give a thorough understanding of the embodiments of the present disclosure. However, those skilled in the art will appreciate that the technical solution of the present disclosure may be practiced without one or more of the specific details, or other methods, elements, and the like may be employed. In other instances, well-known structures, methods, or operations are not shown or described in detail to avoid obscuring aspects of the present disclosure.

The terms 'first' and 'second' are only used for descriptive purposes, and cannot be understood as indicating or implying relative importance or implicitly indicating the number of indicated technical features. Thus, the features defined with 'first' and 'second' may explicitly or implicitly include one or more of these features.

Figure 2A:
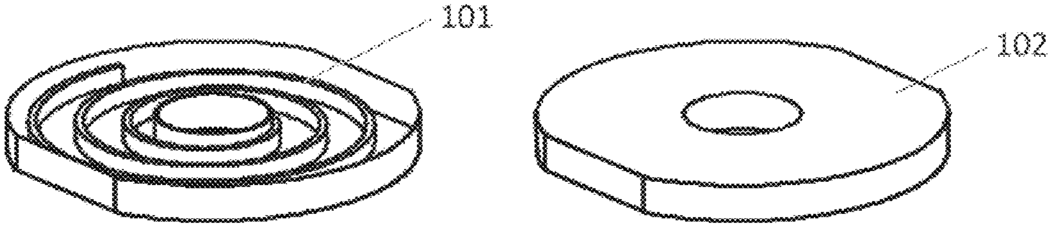
FIG. 2A and FIG. 2B are perspective schematic diagrams of a first coil and a circuit board in the winding assembly shown in FIG. 1.
Figure 2B:
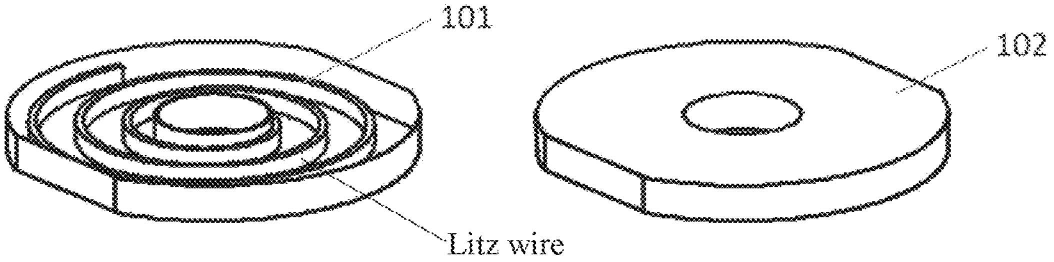

FIG. 1 is a schematic sectional view of a winding assembly according to an exemplary embodiment. FIG. 2A and FIG. 2B are perspective schematic diagrams of a first coil and a circuit board in the winding assembly shown in FIG. 1. As shown in FIG. 1, a winding assembly 10 includes a first coil 101 and a circuit board 102, wherein the first coil 101 includes a conductive wire with at least one turn, and the first coil 101 is embedded inside the circuit board 102, for example Printed Circuit Board (PCB). Wherein, a height of the conductive wire in a direction perpendicular to the circuit board is not less than a width of the conductive wire in a direction parallel to the circuit board. In FIG. 1, cross sections of the conductive wire are shown as black rectangular blocks, and the height of the black rectangular block is greater than the width of the black rectangular block. The coil 101 may be formed by vertically winding flat wires.

The first coil 101 may be a single-layer coil or two-layer coil or multi-layer coil, and the first coil 101 may include one turn or multiple turns, which is not limited by the present disclosure. In the winding assembly 10 shown in FIG. 1, for example, the first coil 101 includes three turns.

The first type parasitic capacitor in the circuit board can be determined by the following formula:

$$C_1 = \varepsilon\frac{s_1}{d_1}$$

wherein, $C_1$ is first type parasitic capacitor; ε is a dielectric constant, which is determined by the material of the circuit board; $S_1$ is a facing area between the turns of the first coil 101; and $d_1$ is a distance between the turns of the first coil 101. Wherein, the distance $d_1$ between the turns of the first coil 101 wound vertically is longer, so the first type parasitic capacitor $C_1$ can be reduced.

In some embodiments, such as shown in FIG. 2A, the conductive wire wound perpendicular to the circuit board 102 may be a flat copper strip embedded inside the circuit board 102 without being exposed to the outside. A height of the flat copper strip in a direction perpendicular to the circuit board 102 is larger than a width of the flat copper strip in a direction parallel to the circuit board 102, referring to cross section of the flat copper strip perpendicular to the circuit board 102.

In some embodiments, such as shown in FIG. 2B, the conductive wire of the first coil 101 may be litz wire, and a cross section perpendicular to the circuit board of the litz wire is substantially circular. Furthermore, a height of the litz wire in the direction perpendicular to the circuit board is roughly equal to a width of the litz wire in the direction parallel to the circuit board. In some embodiments, the first coil 101 can be formed by multiple strands of litz wires having a certain withstand voltage level. In the case of large number of turns, skin effect and proximity effect may be effectively avoided by using litz wire.

The winding assembly 10 may be used as an inductor or a transformer. The transformer may be of any known type, such as a planar transformer. In some embodiments, the first coil 101 may be the primary winding or the secondary winding of the transformer according to product requirements.

Wherein, the present disclosure describes how to form and use specific examples, but the principle of the present disclosure is not limited to any details of these examples. On the contrary, based on the teaching of the disclosure of the present disclosure, these principles can be applied to many other embodiments.

Figure 3A:
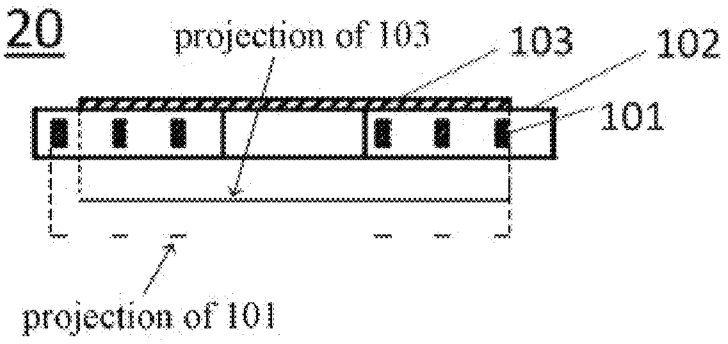
FIG. 3A and FIG. 3B are schematic sectional views of a winding assembly according to an exemplary embodiment of the present disclosure.
Figure 3B:
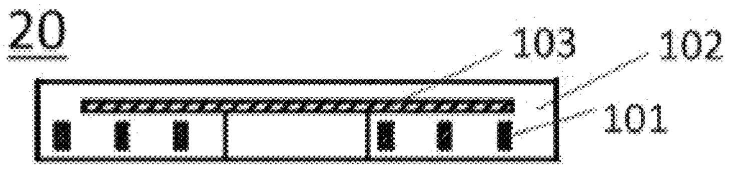
Figure 4:
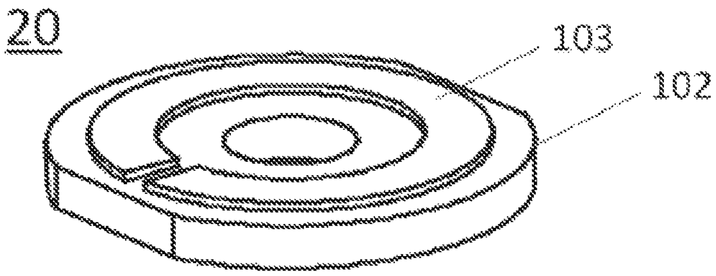
FIG. 4 is a stereoscopic schematic diagram of a winding assembly according to an exemplary embodiment of the present disclosure.

Further, in some embodiments, the winding assembly may also include at least one flat copper coil disposed on a surface of the circuit board or embedded inside the circuit board. Specifically, FIG. 3A and FIG. 3B are schematic sectional views of a winding assembly according to an exemplary embodiment. FIG. 4 is a stereoscopic schematic diagram of a winding assembly according to an exemplary embodiment. As shown in FIG. 3A, FIG. 3B and FIG. 4, the winding assembly 20 includes a first coil 101 and a circuit board 102, and the first coil 101 is embedded inside the circuit board 102. Further, the circuit board 102 includes one flat copper coil 103, and the flat copper coil 103 is disposed on a surface of the circuit board 102 as shown in FIG. 3A. In some other embodiments, the flat copper coil 103 can be embedded inside the circuit board 102 as shown in FIG. 3B. Wherein the flat copper coil 103 and the first coil 101 are insulated.

In some embodiments, the flat copper coil 103 and the first coil 101 are insulated by the circuit board 102. In some embodiments, an insulating material is arranged between the flat copper coil 103 and the first coil 101. In other words, the insulating material between the first coil 101 and the flat copper coil 103 may be integrally formed with the circuit board having the same material, or may be manufactured in an independent process.

Furthermore, the first coil 101 may be a single-layer coil, or two-layer coil or more-layer coil, and the first coil 101 may include one turn or multiple turns.

Figure 5:
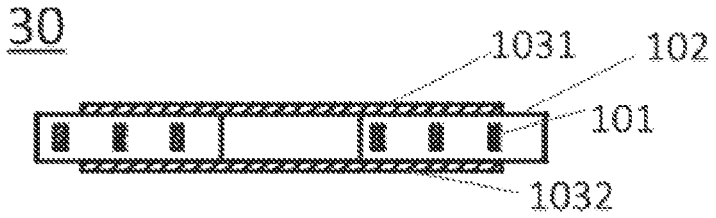
FIG. 5 is a schematic sectional view of a winding assembly according to an exemplary embodiment of the present disclosure.

The flat copper coil 103 can be a single-layer flat copper coil, or a two-layer flat copper coil or multi-layer flat copper coil. In the case of the flat copper coil 103 with two layers, the two layers can be arranged on upper and lower sides of the first coil 101 respectively, as shown in FIG. 5. The flat copper coil 103 can include one turn or multiple turns, which is not limited by the present disclosure.

The second type parasitic capacitor in the circuit board can be determined by the following formula:

$$C_2 = \varepsilon\frac{s_2}{d_2}$$

wherein, $C_2$ is second type parasitic capacitor; ε is a dielectric constant, which is determined by the material of the circuit board; $S_2$ is a facing area between the first coil 101 and the flat copper coil 103; and $d_2$ is a distance between the first coil 101 and flat copper coil 103.

According to the winding assembly provided by the embodiment of the present disclosure, the width of the conductive wire of the first coil 101 in a direction parallel to the circuit board is less than or equal to the height of the first coil 101 in a direction perpendicular to the circuit board, so the facing area between the first coil 101 and the flat copper coil 103 can be reduced, thereby the second type parasitic capacitor of the winding assembly is decreased.

The winding assembly 20 may be a transformer, for example, and the transformer may be of any known type, such as a planar transformer. In some embodiments, the first coil 101 may be the primary winding of the planar transformer and the flat copper coil 103 may be the secondary winding of the planar transformer, according to product requirements. Alternatively, the first coil 101 can also be the secondary winding of the planar transformer, and the flat copper coil 103 can be the primary winding of the planar transformer. In another embodiment, the flat copper coil 103 can also be used as a shielding layer for the primary side or the secondary side of the transformer.

Further, the first coil 101, the flat copper coil 103 and the circuit board 102 are coaxially assembled to form the winding assembly 20. And a projection of the flat copper coil 103 in a plane where the circuit board 102 is located partially overlaps with a projection of the first coil 101 in that plane.

According to the winding assembly provided by the embodiment of the present disclosure, the facing area between the first coil 101 and the flat copper coil 103 located at a surface of the circuit board 102 and/or inside of the circuit board 102 can be reduced, thereby the second type parasitic capacitor of the winding assembly is decreased.

FIG. 5 is a schematic sectional view of a winding assembly according to an exemplary embodiment. As shown in FIG. 5, the winding assembly 30 includes a first coil 101 and a circuit board 102, and the first coil is embedded inside the circuit board 102. Further, the winding assembly 30 includes a first flat copper coil 1031 and a second flat copper coil 1032. the first flat copper coil 1031 and the first coil 101 are insulated, and the first coil 101 and the second flat copper coil 1032 are insulated. As shown in FIG. 5, the first flat copper coil 1031 is disposed on a top surface of the circuit board 102, and the second flat copper coil 1032 is disposed on a bottom surface of the circuit board 102, so the first flat copper coil 1031 and the second flat copper coil 1032 can be stacked on the upper and lower sides of the first coil 101, respectively.

In some other embodiments, the first flat copper coil 1031 and the second flat copper coil 1032 may be located inside of the circuit board 102

Furthermore, the first coil 101 may be a single-layer first coil, or two-layer first coil or multi-layer first coil first coils, and the first coil 101 may include one turn or multiple turns. The first flat copper coil 1031 and the second flat copper coil 1032 can include one turn or multiple turns, which are not limited by the present disclosure.

In some embodiments, the insulating material between the first flat copper coil 1031 and the first coil 101 or between the second flat copper coil 1032 and the first coil 101 can be integrally formed with the circuit board 102 having the same material. That is, the first flat copper coil 1031, the second flat copper coil 1032 and the first coil 101 can be insulated by the circuit board 102. Or the insulating material between the first flat copper coil 1031 and the first coil 101 or between the second flat copper coil 1032 and the first coil 101 can be made in an independent process and then disposed in the circuit board 102.

In some embodiments, the first flat copper coil 1031 and the second flat copper coil 1032 may be connected electrically by vias.

The winding assembly 30 may be used in a transformer, for example, and the transformer may be of any known type, such as a planar transformer. In some embodiments, the first coil 101 can be the primary winding of the planar transformer, and the first flat copper coil 1031 and the second flat copper coil 1032 can be the secondary winding of the planar transformer, according to product requirements. Alternatively, the first coil 101 can be the secondary winding of the planar transformer, and the first flat copper coil 1031 and the second flat copper coil 1032 can be the primary winding of the planar transformer. In another embodiment, the flat copper coil 1031 and/or the flat copper coil 1032 can also be used as a shielding layer of the primary side or the secondary side of the transformer.

In some embodiments, the first coil 101, the first flat copper coil 1031, the second flat copper coil 1032 and the circuit board 102 are coaxially assembled to form the winding assembly 30. In some embodiments, projections of the first flat copper coil 1031 and the second flat copper coil 1032 in a plane where the circuit board 102 is located partially overlaps with a projection of the first coil 101 in that plane. That is, a projection of the first flat copper coil 1031 in a plane where the circuit board 102 is located partially overlaps with a projection of the first coil 101 in that plane, and at the same time a projection of the second flat copper coil 1032 in that plane also partially overlaps with a projection of the first coil 101 in that plane.

According to the winding assembly provided by the embodiment of the present disclosure, the facing area between the first coil 101 and the first flat copper coil 1031, and the facing area between the first coil 101 and the second flat copper coil 1032 can be reduced, thereby the parasitic capacitor of the winding assembly is decreased.

Figure 6:
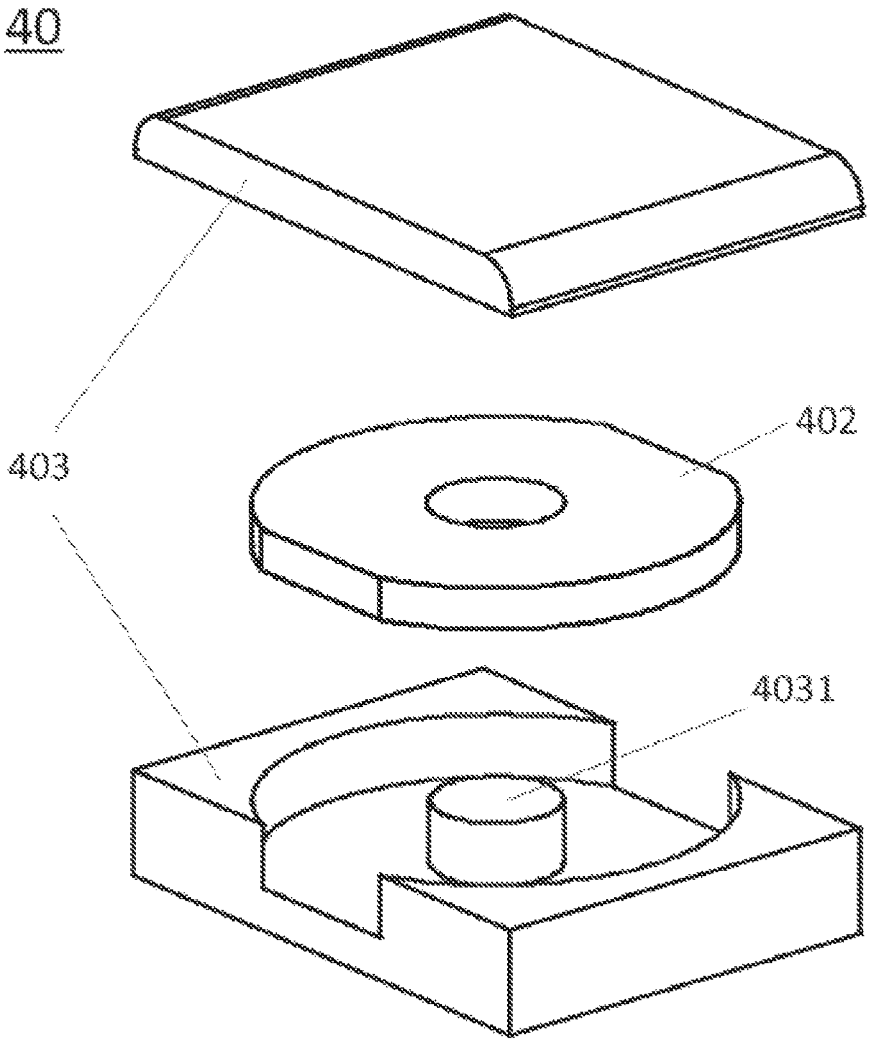
FIG. 6 is an exploded view of a magnetic assembly according to an exemplary embodiment of the present disclosure.

FIG. 6 is an exploded view of a magnetic assembly according to an exemplary embodiment. As shown in FIG. 6, the magnetic assembly 40 includes a first winding assembly and a magnetic core 403. The first winding assembly includes a first coil (not shown in FIG. 6) and a first circuit board 402. The first coil includes a conductive wire with at least one turn, the first coil is embedded inside the first circuit board 402, and a height of the conductive wire in a direction perpendicular to the first circuit board 402 is not less than a width of the conductive wire in a direction parallel to the first circuit board 402. A through hole is provided on the first circuit board 402, and the middle leg 4031 of the magnetic core 403 passes through the through hole, and the first circuit board 402 is assembled with the magnetic core 403. Further, the first coil may be a single-layer coil or two-layer coil or multi-layer coil, and the first coil may include one turn or multiple turns, which is not limited by the present disclosure.

In some embodiments, the conductive wire may be a flat copper strip, and a height of the flat copper strip in a direction perpendicular to the circuit board 402 is larger than a width of the flat copper strip in a direction parallel to the circuit board 402.

In some embodiments, the conductive wire is litz wire with at least one turn. A cross section perpendicular to the circuit board of the litz wire is substantially circular. Furthermore, a height of the litz wire in the direction perpendicular to the circuit board is roughly equal to a width of the litz wire in the direction parallel to the circuit board. In some embodiments, the first coil can be formed by multiple strands of litz wires having a certain withstand voltage level. The cross section of the first coil perpendicular to the circuit board is substantially circular. Furthermore, the height of the first coil in the direction perpendicular to the circuit board is proximately equal to a width in the direction parallel to the circuit board. In the case of large number of turns, skin effect and proximity effect may be effectively avoided by the use of litz wire.

The magnetic assembly 40 may be, for example, an inductor or a transformer. The transformer may be of any known type, such as a planar transformer. In some embodiments, the first coil may be the primary winding or the secondary winding of the planar transformer according to product requirements. In some embodiments, the magnetic assembly is an inductor.

The magnetic core 403 may be made of, for example, a magnetic metal oxide composed of a mixture of iron oxides. For example, the magnetic core 403 can be made of manganese-zinc ferrite materials and nickel-zinc ferrite materials. The magnetic core 403 can be any suitable shape, for example, an 'E'-shaped magnetic core and so on.

The first coil surrounds the middle leg 4031 of the magnetic core 403. The magnetic core 403, the first circuit board 402 and the first coil are assembled to form the magnetic assembly 40.

Figure 7:
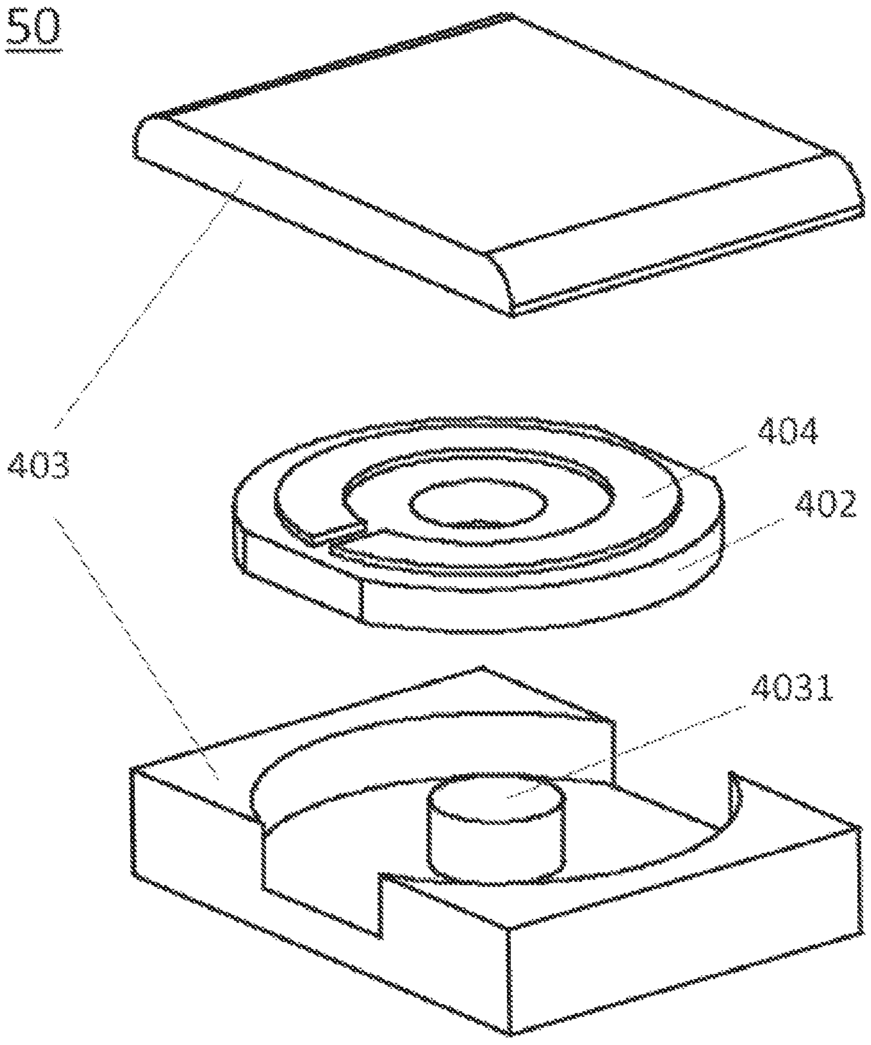
FIG. 7 is an exploded view of a magnetic assembly according to an exemplary embodiment of the present disclosure.

FIG. 7 is an exploded view of a magnetic assembly according to an exemplary embodiment. As shown in FIG. 7, the magnetic assembly 50 includes a first winding assembly and a magnetic core 403. The first winding assembly includes a first coil (not shown) and a first circuit board 402. The first coil includes conductive wire with at least one turn, the first coil is embedded inside the first circuit board 402, and a height of the conductive wire in a direction perpendicular to the first circuit board 402 is not less than a width of the conductive wire in a direction parallel to the first circuit board 402. The circuit board 402 further includes at least one flat copper coil 404, and the at least one flat copper coil 404 is disposed on the surface of the first circuit board 402 or embedded inside the first circuit board 402. Furthermore, at least one flat copper coil 404 and the first coil are insulated.

In some embodiments, the magnetic assembly 50 is a transformer, and the transformer can be of any known type, such as a planar transformer; the first coil is the primary winding of the planar transformer, and the flat copper coil 404 is the secondary winding of the planar transformer. In some embodiments, the first coil is the secondary winding of the planar transformer, and the flat copper coil 404 is the primary winding of the planar transformer.

In some embodiments, a projection of the flat copper coil 404 in a plane where the first circuit board 402 is located partially overlaps with a projection of the first coil in that plane.

The magnetic core 403 may be made of, for example, a magnetic metal oxide composed of a mixture of iron oxides. For example, the magnetic core 403 can be made of manganese-zinc ferrite materials and nickel-zinc ferrite materials. The magnetic core 403 can be any suitable shape, for example, an 'E'-shaped magnetic core and so on.

The first coil surrounds the middle leg 4031 of the magnetic core 403, and the flat copper coil 404 surrounds the middle leg 4031 of the magnetic core 403. According to the magnetic assembly provided by the embodiment of the present disclosure, the facing area between the first coil and the flat copper coil 404 located at a surface of the circuit board 402 and/or inside of the circuit board 402 can be reduced, thereby the parasitic capacitor of the winding assembly is reduced.

Figure 8:
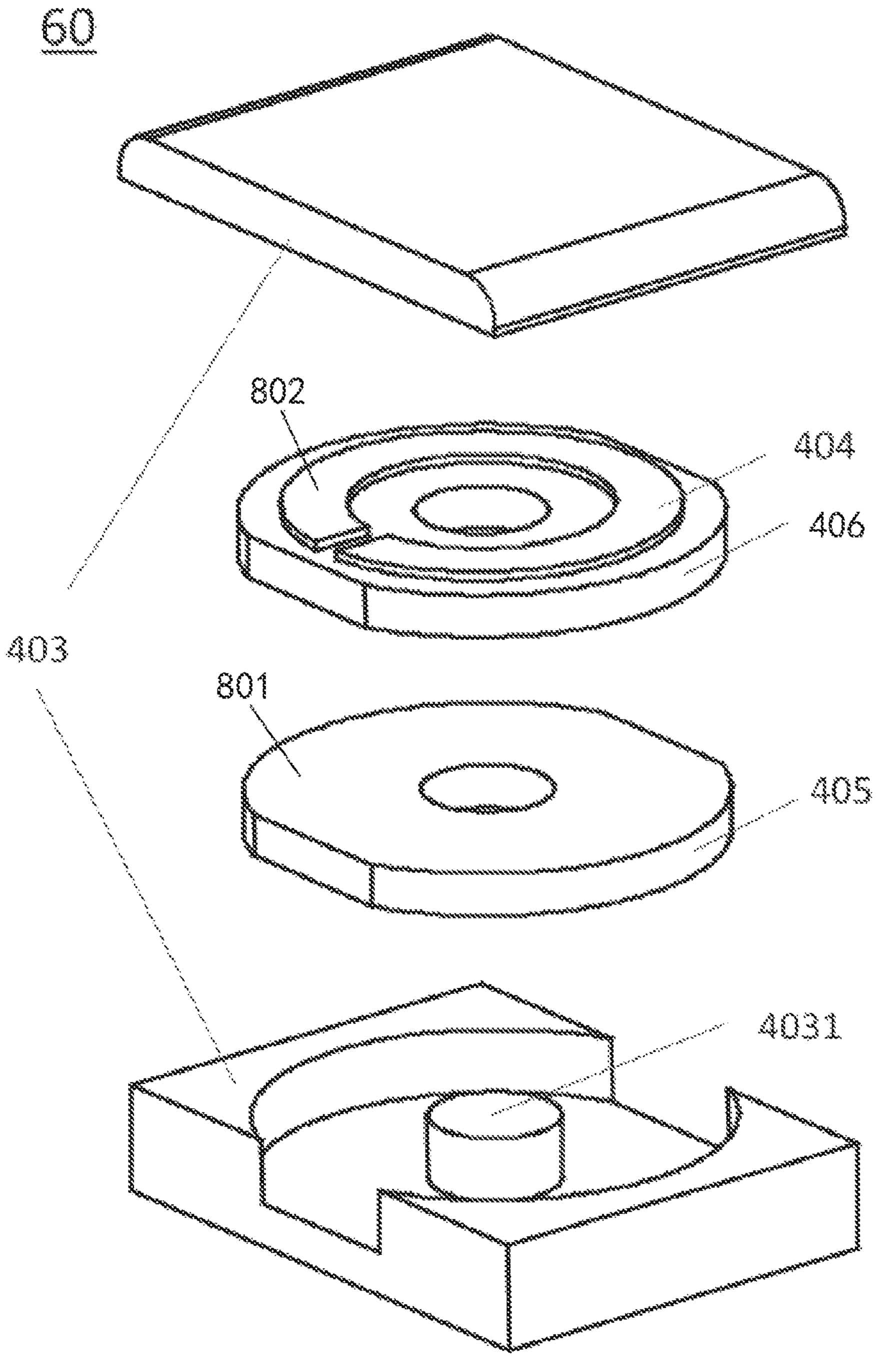
FIG. 8 is an exploded view of a magnetic assembly according to an exemplary embodiment of the present disclosure.

FIG. 8 is an exploded view of a magnetic assembly according to an exemplary embodiment. As shown in FIG. 8, the magnetic assembly 60 includes a first winding assembly 801, a second winding assembly 802, and a magnetic core 403. The first winding assembly 801 includes a first coil (not shown) and a first circuit board 405. The first coil includes conductive wire with at least one turn, the first coil is embedded inside the first circuit board 405, and a height of the conductive wire in the direction perpendicular to the first circuit board 405 is not less than a width of the conductive wire in the direction parallel to the first circuit board 405. The second winding assembly 802 includes a second circuit board 406, and the second circuit board 406 also includes a flat copper coil 404, which is arranged in a surface of the second circuit board 406 or embedded inside the second circuit board 406, wherein the second winding assembly 802 and the first winding assembly 801 are disposed in a manner stacked with each other. The second winding assembly 802, the first winding assembly 801 and the magnetic core 403 are assembled together.

In some embodiments, the magnetic assembly 60 further includes a third winding assembly, and the second winding assembly and the third winding assembly are disposed on the upper and lower sides of the first winding assembly respectively in a stacked manner. Wherein, there is no limit on the number of the second winding assembly and the third winding assembly in the present disclosure.

In some embodiments, the magnetic assembly 60 is a transformer, and the transformer can be any known type, such as a planar transformer; the first coil is the primary winding of the planar transformer, and the flat copper coil 404 is the secondary winding of the planar transformer. In some embodiments, the first coil is the secondary winding of the planar transformer, and the flat copper coil 404 is the primary winding of the planar transformer.

In some embodiments, a projection of the flat copper coil 404 in a plane where the first circuit board 405 is located partially overlaps with a projection of the first coil in that plane.

The magnetic core 403 may be made of, for example, a magnetic metal oxide composed of a mixture of iron oxides. For example, the magnetic core 403 can be made of manganese-zinc ferrite materials and nickel-zinc ferrite materials. The magnetic core 403 can be any suitable shape, for example, an 'E'-shaped magnetic core and so on.

Furthermore, the first coil surrounds the middle leg 4031 of the magnetic core 403, and the flat copper coil surrounds the middle leg 4031 of the magnetic core 403.

According to the magnetic assembly provided by the embodiment of the present disclosure, the facing area between the first coil and the flat copper coil 404 located at the surface of the second circuit board 406 and/or inside of the second circuit board 406 is reduced, thereby reducing the parasitic capacitance of the magnetic assembly.

The exemplary embodiments of the present disclosure are specifically shown and described above. It should be understood that the present disclosure is not limited to the detailed structure, arrangement or implementation method described here; on the contrary, the present disclosure intends to cover various modifications and equivalent arrangements included in the spirit and scope of the appended claims.

What is claimed is:

1. A magnetic assembly, comprising:

a first winding assembly and a magnetic core, the first winding assembly being assembled with the magnetic core; wherein the first winding assembly comprises a first coil and a first circuit board, the first coil is embedded inside the first circuit board, and the first coil comprises a conductive wire with at least one turn, and a height of the conductive wire in a direction perpendicular to the first circuit board is not less than a width of the conductive wire in a direction parallel to the first circuit board, wherein the first circuit board further comprises at least one flat copper coil disposed on a surface of the first circuit board or embedded inside the first circuit board, and the at least one flat copper coil is insulated with the first coil, wherein the flat copper coil and the first coil are wound around an identical single magnetic column of the magnetic core, and neither coil is wound around any other magnetic column, and wherein an orthographic projection of the at least one flat copper coil in a plane where the first circuit board is located partially overlaps with an orthographic projection of the first coil in that plane.

2. The winding assembly according to claim 1, wherein the at least one flat copper coil comprises a first flat copper coil and a second flat copper coil, and the first flat copper coil and the first coil are insulated, and the first coil and the second flat copper coil are insulated.

3. The magnetic assembly according to claim 1, further comprising a second winding assembly assembled with the magnetic core; wherein, the second winding assembly comprises a second circuit board, and the second circuit board further comprises at least one flat copper coil disposed on a surface of the second circuit board or embedded inside the second circuit board; wherein the second winding assembly and the first winding assembly is disposed in a stacked manner with each other.

4. The magnetic assembly according to claim 3, further comprising a third winding assembly assembled with the magnetic core; wherein, the third winding assembly comprises a third circuit board, and the third circuit board further comprises at least one flat copper coil disposed on a surface of the third circuit board or embedded inside the third circuit board; wherein the second winding assembly and the third winding assembly are stacked on upper and lower sides of the first winding assembly respectively.

5. The magnetic assembly according to claim 1, wherein the magnetic assembly is a transformer, the first coil is a primary winding of the transformer, and the at least one flat copper coil is a secondary winding of the transformer.

6. The magnetic assembly according to claim 1, wherein the magnetic assembly is a transformer, the first coil is a secondary winding of the transformer, and the at least one flat copper coil is a primary winding of the transformer.

7. The magnetic assembly according to claim 1, wherein the magnetic assembly is a transformer, and the at least one flat copper coil is a shielding layer.

8. The magnetic assembly according to claim 1, wherein the magnetic assembly is an inductor.

9. The winding assembly according to claim 1, wherein the conductive wire is a flat copper strip.

10. The winding assembly according to claim 1, wherein the conductive wire is litz wire.

* * * * *